US010180864B2

(12) United States Patent
He et al.

(10) Patent No.: US 10,180,864 B2
(45) Date of Patent: Jan. 15, 2019

(54) INCREASING EFFICIENCY OF AN EVENT PROCESSING SYSTEM

(71) Applicant: SAP SE, Walldorf (DE)

(72) Inventors: Rocky He, Shanghai (CN); Chester Feng, Shanghai (CN); Grace Yu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/349,553

(22) Filed: Nov. 11, 2016

(65) Prior Publication Data

US 2018/0136987 A1 May 17, 2018

(51) Int. Cl.
*G06F 9/54* (2006.01)

(52) U.S. Cl.
CPC ............ *G06F 9/542* (2013.01); *G06F 9/543* (2013.01)

(58) Field of Classification Search
CPC .................................. G06F 9/542; G06F 9/543
See application file for complete search history.

(56) References Cited

U.S. PATENT DOCUMENTS

| 2009/0094073 | A1* | 4/2009 | Cheung | G06Q 30/02 |
| | | | | 705/14.47 |
| 2015/0100436 | A1* | 4/2015 | Spofford | G06Q 30/0275 |
| | | | | 705/14.71 |
| 2016/0042388 | A1* | 2/2016 | Chater | G06Q 30/0246 |
| | | | | 705/14.45 |
| 2017/0178253 | A1* | 6/2017 | Koufogiannakis | G06Q 50/01 |

* cited by examiner

*Primary Examiner* — Charles E Anya
(74) *Attorney, Agent, or Firm* — Schwegman Lundberg & Woessner, P.A.

(57) ABSTRACT

Systems and methods of increasing the efficiency of an event processing system are disclosed. In some example embodiments, a computer-implemented method comprises identifying a first group of computing events from a plurality of computing events in an execution pipeline based on a similarity between the computing events of the first group, and merging the computing events of the first group into a single representative computing event of the first group in the execution pipeline. In some example embodiments, the identifying of the first group of computing events comprises calculating a corresponding identifier using a hash function on at least one attribute of the corresponding computing event for each one of the plurality of computing events in the execution pipeline, and determining that the computing events of the first group have corresponding identifiers that match each other.

16 Claims, 10 Drawing Sheets

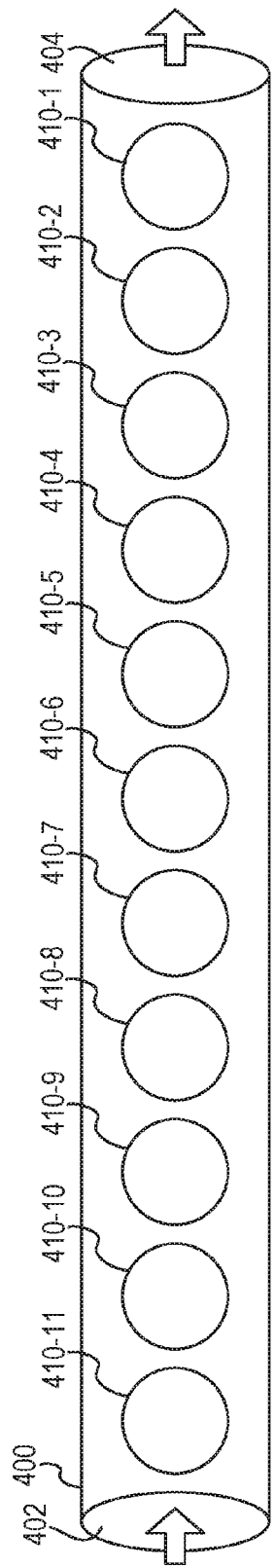
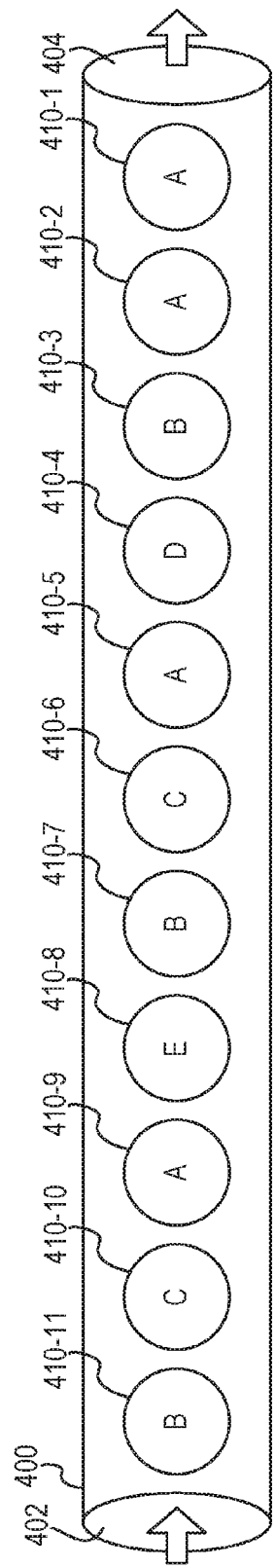
FIG. 4A
FIG. 4B

INCREASING EFFICIENCY OF AN EVENT PROCESSING SYSTEM

TECHNICAL FIELD

The present application relates generally to the technical field of data processing, and, in various embodiments, to systems and methods of increasing the efficiency of an event processing system.

BACKGROUND

Systems that process computing events often suffer from an inability to efficiently expand their volume. Such deficiency makes it difficult for an event processing system to accommodate large numbers of computing events to process or a sudden increase in the number of computing events to process. Typical solutions, such as increasing the number of machines to share the processing burden, are insufficient, as they often require additional hardware and still do not improve the performance (e.g., consumption speed) of a single processing machine.

BRIEF DESCRIPTION OF THE DRAWINGS

Some example embodiments of the present disclosure are illustrated by way of example and not limitation in the figures of the accompanying drawings, in which like reference numbers indicate similar elements.

FIGS. 4A-4D illustrate different stages of increasing the efficiency of processing computing events in an execution pipeline of an event processing system, in accordance with some example embodiments.

DETAILED DESCRIPTION

Figure 1:
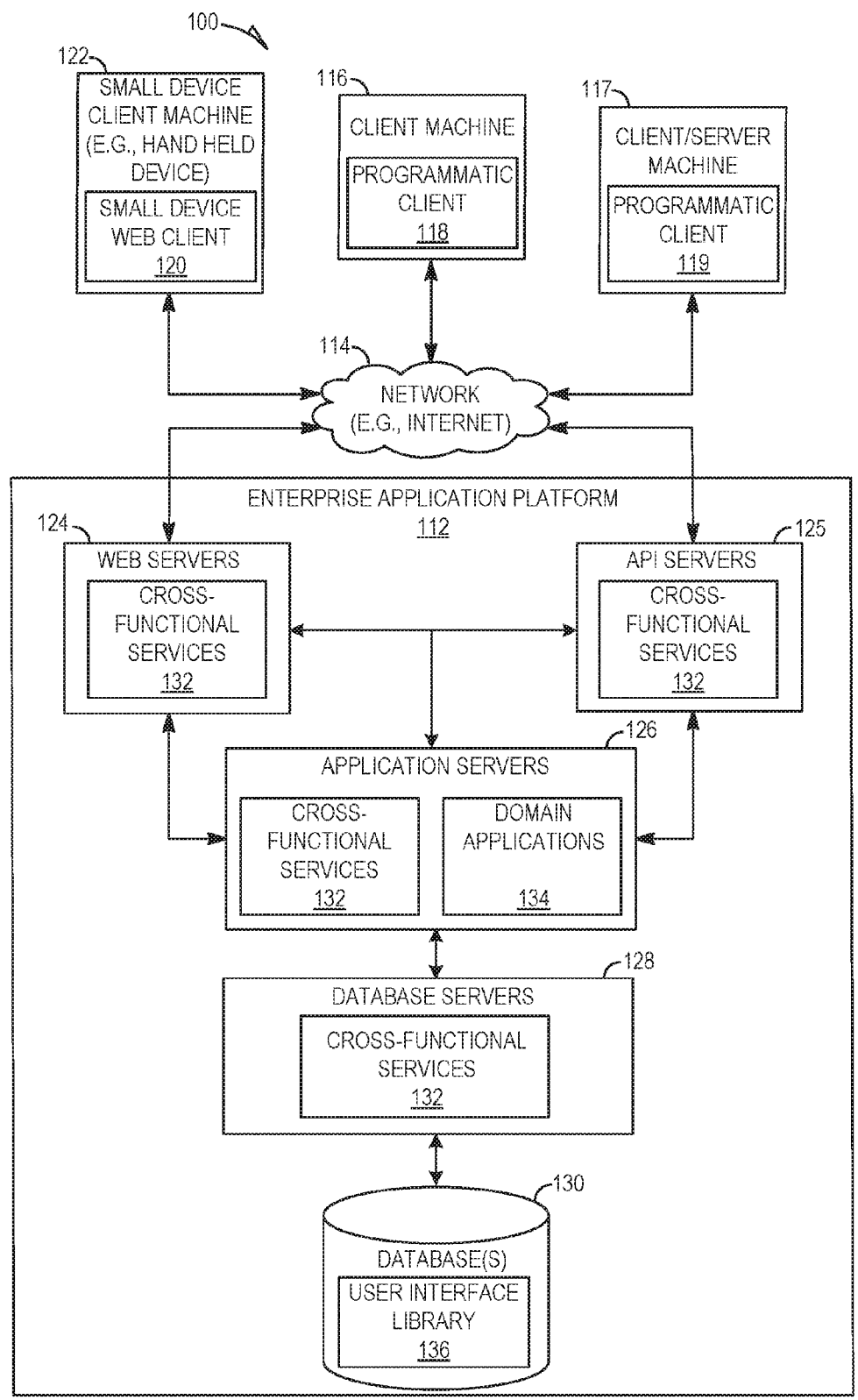
FIG. 1 is a network diagram illustrating a client-server system, in accordance with some example embodiments.

Example methods and systems of increasing the efficiency of an event processing system are disclosed. In the following description, for purposes of explanation, numerous specific details are set forth in order to provide a thorough understanding of example embodiments. It will be evident, however, to one skilled in the art that the present embodiments can be practiced without these specific details.

Some technical effects of the system and method of the present disclosure are to increase the efficiency of an event processing system by effectively increasing the available volume, and thereby the performance, of the event processing system. Some technical solutions of the system and method of the present disclosure include scanning computing events in an execution pipeline, comparing the scanned computing events to identify one or more groups of equivalent computing events in the execution pipeline, and then compressing (e.g., merging) the equivalent computing events into one computing event within the execution pipeline, thereby eliminating the wasteful processing of duplicate computing events. In this way, the volume is increased in an effective way. As a result, the performance of the event processing system can be improved without having to use additional resources, such as additional processing units. Additionally, other technical effects will be apparent from this disclosure as well.

In some example embodiments, a computer-implemented method comprises identifying a first group of computing events from a plurality of computing events in an execution pipeline based on a similarity between the computing events of the first group, and merging the computing events of the first group into a single representative computing event of the first group in the execution pipeline. In some example embodiments, the execution pipeline comprises a first-in first-out (FIFO) data structure. In some example embodiments, the computer-implemented method further comprises executing the single representative computing event of the first group.

In some example embodiments, the merging of the computing events of the first group comprises selecting one of the computing events of the first group to be the single representative computing event of the first group, and removing all of the computing events of the first group other than the selected one from the execution pipeline.

In some example embodiments, the selecting of the one of the computing events of the first group to be the single representative computing event of the first group comprises identifying an oldest computing event in the first group, and selecting the one of the computing events of the first group to be the single representative computing event of the first group based on the selected one being identified as the oldest computing event in the first group.

In some example embodiments, the selecting of the one of the computing events of the first group to be the single representative computing event of the first group comprises identifying a youngest computing event in the first group, and selecting the one of computing events of the first group to be the single representative computing event of the first group based on the selected one being identified as the youngest computing event in the first group.

In some example embodiments, the identifying of the first group of computing events comprises calculating a corresponding identifier using a hash function on at least one attribute of the corresponding computing event for each one of the plurality of computing events in the execution pipeline, and determining that the computing events of the first group have corresponding identifiers that match each other. In some example embodiments, the at least one attribute comprises at least one of an event type, an event identification, an event content, and a merge method. In some example embodiments, the hash function comprises an MD5 hash function.

In some example embodiments, the computer-implemented method further comprises identifying a second group of computing events from the plurality of computing events in the execution pipeline based on a similarity between the computing events of the second group, and merging the computing events of the second group into a single representative computing event of the second group in the execution pipeline, with the single representative computing event of the second group being in the execution pipeline concurrently with the single representative computing event of the first group.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition level operation with concurrent activities. For example, the enterprise application platform 112 can implement a partition level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
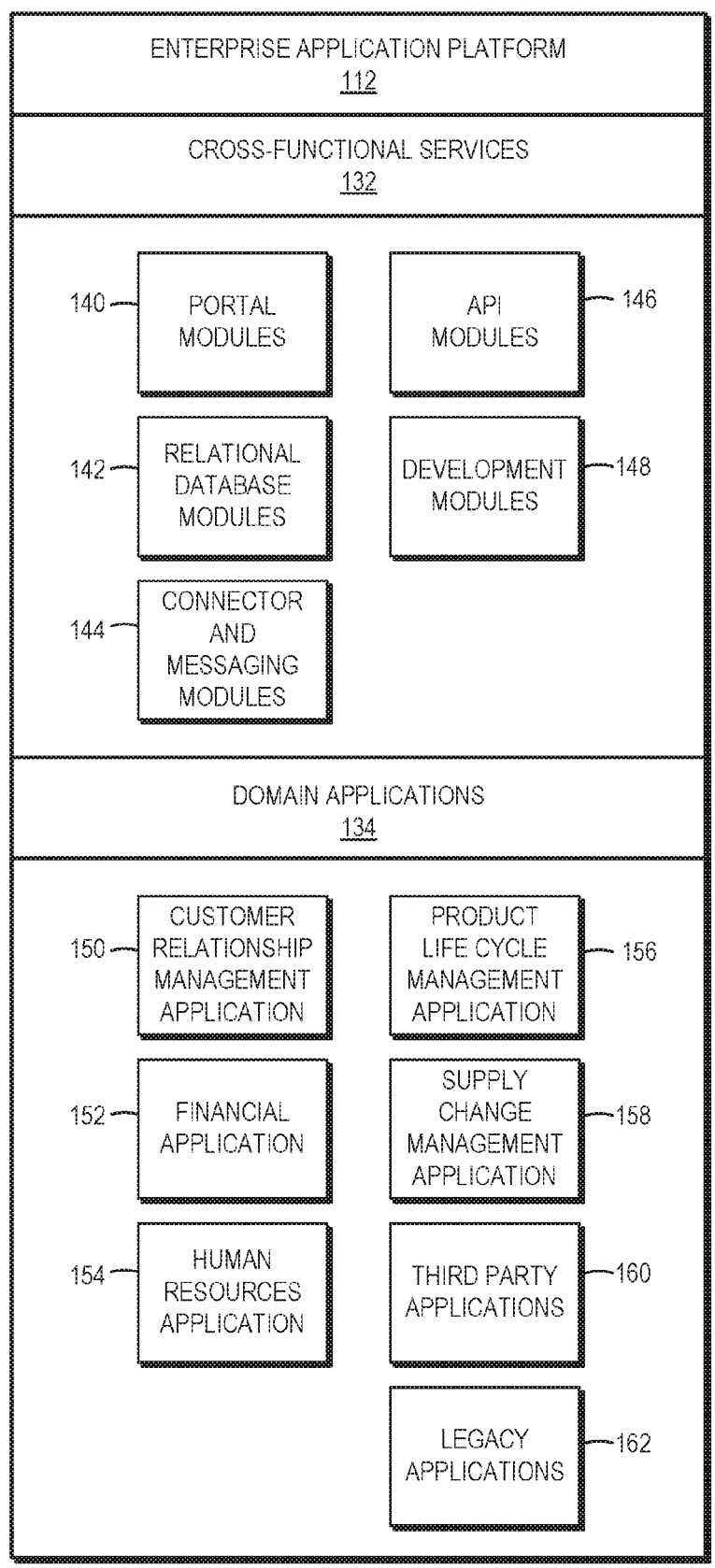
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft.NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
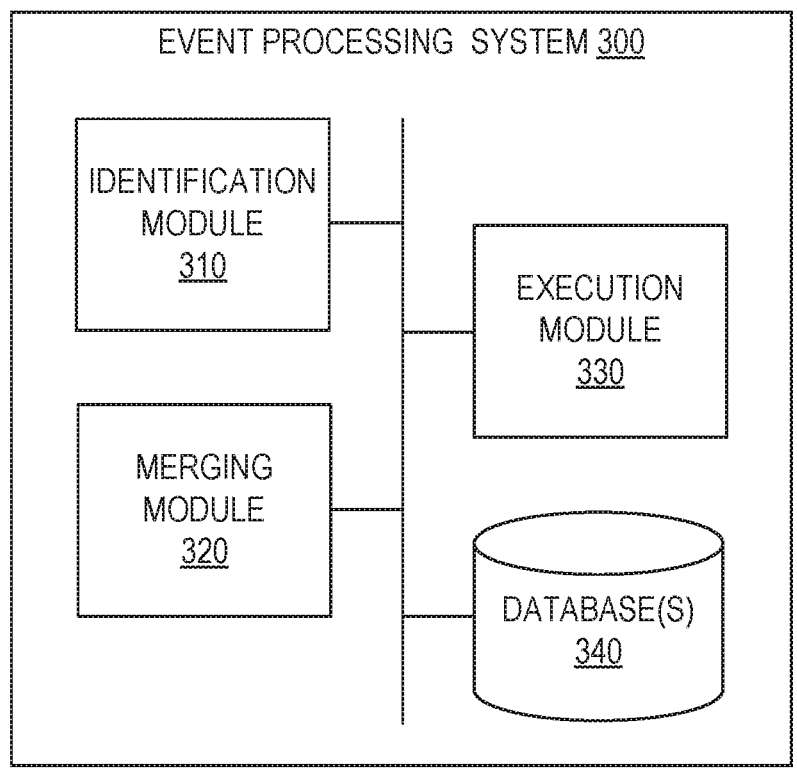
FIG. 3 is a block diagram illustrating an event processing system, in accordance with some example embodiments.

FIG. 3 is a block diagram illustrating an event processing system 300, in accordance with some example embodiments. In some example embodiments, the event processing system 300 comprises any combination of one or more of an identification module 310, a merging module 320, an execution module 330, and one or more databases 340.

In some example embodiments, the modules 310, 320, and 330 and the database(s) 340 reside on a machine having a memory and at least one processor (not shown). In some example embodiments, the modules 310, 320, and 330 and the database(s) 340 reside on the same machine, while in other example embodiments, one or more of modules 310, 320, and 330 and database(s) 340 reside on separate remote machines that communicate with each other via a network (e.g., network 114 in FIG. 1). In some example embodiments, the modules 310, 320, and 330 and the database(s) 340 can be incorporated into the enterprise application platform 112 in FIG. 1 (e.g., on application server(s) 126). However, it is contemplated that other configurations are also within the scope of the present disclosure.

FIGS. 4A-4D illustrate different stages of increasing the efficiency of processing events in an execution pipeline 400 of event processing system 300, in accordance with some example embodiments. In some example embodiments, the execution pipeline 400 comprises a first-in first-out (FIFO) data structure, such as a data buffer acting as a queue for processing computing events, where computing events are processed in the order that they are received by or added to the queue. Although examples disclosed within the present disclosure involve an execution pipeline 400 having a FIFO data structure, it is contemplated that other types of execution pipelines are also within the scope of the present disclosure. In some example embodiments, the execution pipeline 400 is implemented using database(s) 340 and/or any other data storage mechanisms or memory structures suitable for implementing a pipeline for computing events.

A computing event may comprise any action or occurrence that can be detected by a program and then handled (e.g., executed) by the program. Examples of computing events include, but are not limited to, user actions (e.g., mouse clicks, key presses), sensor outputs, or messages from other programs or threads. In some example embodiments, a computing event comprises an event header and an event body. The event header may include information such as a name or other identifier for the event, a timestamp for the event, and a type of the event, while the event body provides the details of a state change corresponding to the computing event.

As seen in FIG. 4A, the execution pipeline 400 can receive a plurality of computing events 410 with computing events 410 entering the execution pipeline 400 at the tail 402 of the execution pipeline 400 and then eventually leaving the execution pipeline 400 at the head 404 of the execution pipeline 400 in the order in which they entered the execution pipeline 400 using a FIFO method. In the example embodiment shown in FIG. 4A, computing event 410-1 is received into the execution pipeline 400 first, followed by computing event 410-2, and then computing 410-3, and so on and so forth, up until computing event 410-11, which is the most recent computing event 410 received by the execution pipeline 400.

Referring back to FIG. 3, in some example embodiments, the identification module 310 is configured to identify one or more groups of computing events 410 from the plurality of computing events 310 in the execution pipeline 400 based on a similarity between the computing events 410. The identification module 310 can compare the computing events 410 to each other to determine which computing events 410 are equivalent, or otherwise sufficiently similar, to one another. Those computing events 410 that are identified as being sufficiently similar to one another are then identified by the identification module 310 as being part of the same group. In some example embodiments, the identification module 310 is configured to determine which computing events 410 in the execution pipeline 400 correspond to a particular time window and then compare only the computing events 410 that correspond to that particular time window. For example, the identification module 310 may be configured to use a moving one-minute window, only comparing computing events 410 that have been entered into the execution pipeline 400 or timestamped within the last minute.

In some example embodiments, the identification module 310 is configured to identify one or more groups of computing events 410 in the execution pipeline 400 by, for each one of the computing events 410 in the execution pipeline 400, calculating a corresponding identifier using a hash function on one or more attributes of the corresponding computing event 410, and then identify which computing events 410 belong to the same group based on a comparison of their corresponding identifiers, grouping together computing events 410 that have matching identifiers.

In some example embodiments, the one or more attributes of the computing event 410 comprises any combination of one or more of an event type, an event identification, an event content, and a merge method. The event type comprises an indication of whether the computing event 410 is mergeable (e.g., able or allowed to be merged) or non-mergeable (not able or allowed to be merged). The event identification comprises an indication of the identity, such as the name, of the computing event 410. The event content comprises content that is to be used in the processing of the computing event 410, such as a template with one or more variables that are to be used in processing the computing event 410. The merge method comprises an indication of a merging criteria that needs to be satisfied in order for the computing event 410 to be merged and/or an indication of how the computing event 410 is to be merged with one or more other computing events 410.

For example, one merge method may provide an instruction or indication for the event processing system 300 to merge the computing event 410 with any other computing events 410 of the same group into a single representative computing event 410 of the group based on one or more merging criteria being satisfied. In some example embodiments, the merging criteria is simply that the computing events 410 belong to the same group, while in other example embodiments, the merging criteria includes one or more additional standards, such as a minimum number of computing events in the group (e.g., computing events 410 of the same group should only be merged if there are three or more computing events 410 in that group). It is contemplated that other types of merging criteria are also within the scope of the present disclosure.

In some example embodiments, the attributes of the computing event 410 are provided in the form of indications (e.g., names, digits, codes, or other types of identifiers), which can be mapped in the database(s) 340 to instructions or other indications of how they should be processed. These mappings, which can be stored in the database(s) 340, can then be accessed during operation of the event processing system 300 in order to determine when and how the event processing system 300 should merge computing events 410 within the execution pipeline.

In some example embodiments, the hash function used by the identification module 310 to calculate the identifier for a computing event 410 comprises an MD5 hash function. The MD5 hash function is a hash function that produces a 128-bit hash value. It is contemplated that other hash functions or techniques for calculating an identifier for a computing event 410 based on one or more attributes of the computing event 410 are also within the scope of the present disclosure.

In some alternative example embodiments, a similarity threshold is used to determine whether computing events 410 are sufficiently similar to one another. For example, the similarity threshold may comprise a minimum level of similarity between the attributes of the computing events 410. In some example embodiments, the similarity threshold may require a 100% match between the attributes of the computing events 410 for them to be determined to be sufficiently similar.

In other example embodiments, the similarity threshold does not require a 100% match, but rather a percentage match greater than 0% and less than 100%. For example, the similarity threshold may only require that the computing events 410 have attributes with less than a 5% difference between them for them to be determined to be sufficiently similar to be identified as belonging to the same group. In some example embodiments where the similarity threshold requires a percentage match greater than 0% and less than 100%, the identification module 310 does not use a hash function to calculate identifiers and then compare the calculated identifiers, but rather compares the corresponding attributes themselves directly to one another. For example, the identification module 310 may determine that two different computing events 410 have the same event type, the same event identification, and the same merge method, but different event content. Depending on the degree of difference between the event content of the two different computing events 410, the identification module 310 may determine whether or not the two computing events 410 belong to the same group. For example, the identification module 310 may employ a 98% similarity threshold, such that the identification module 310 will determine that the two computing events 410 are sufficiently similar if the two computing events 410 share 98% of the same event content. It is contemplated that other similarity thresholds are also within the scope of the present disclosure.

In the example embodiment shown in FIG. 4B, the identification module 310 has compared computing events 410-1, 410-2, 410-3, . . . , 410-10, and 410-11 to one another and determined that computing events 410-1, 410-2, 410-5, and 410-9 are sufficiently similar to one another (e.g., have matching calculated identifiers), computing events 410-3, 410-7, and 410-11 are sufficiently similar to one another (e.g., have matching calculated identifiers), and computing events 410-6 and 410-10 are sufficiently similar to one another (e.g., have matching calculated identifiers), while computing events 410-4 and 410-8 are not sufficiently similar to any other computing events 410 in the execution pipeline 400 or, alternatively, to any other computing events 410 in the execution pipeline 400 corresponding to a specified time period (e.g., computing events 410 having a timestamp within the last minute). The identification module 310 can then identify computing events 410-1, 410-2, 410-5, and 410-9 as belonging to group A, computing events 410-3, 410-7, and 410-11 as belonging to group B, and computing events 410-6 and 410-10 as belonging to group C. Identification module 310 can also identify computing event 410-4 belonging to group D and 410-8 as belonging to group E. Group labels of A, B, C, D, and E are used in the present disclosure merely as examples of how the identification module 310 can organize the computing events 410 into groups in order to make this grouping concept easy to understand and should not be interpreted to limit the scope of claims unless expressly recited in the claims.

In some example embodiments, the merging module 320 is configured to merge the computing events 410 of the same group into a single representative computing event 410 of that group in the execution pipeline 410. In some example embodiments, the merging module 320 is configured to merger computing events 410 of a group by selecting one of the computing events 410 of the group to be the single representative computing event 410 of the group, and then removing one or more of the computing events 410 of the group other than the selected computing event 410 from the execution pipeline 400.

In some example embodiments, the selecting of the computing event 410 in the group to be the single representative computing event 410 of the group comprises identifying the youngest computing event 410 in the group, and then selecting the identified youngest computing event 410 of the first group to be the single representative computing event 410 of the group based on the selected computing event 410 being identified as the oldest computing event 410 in the group. For example, for an identified group, the merging module 320 can determine which computing event 410 in that identified group comprises the latest or most recent timestamp.

Figure 4C:
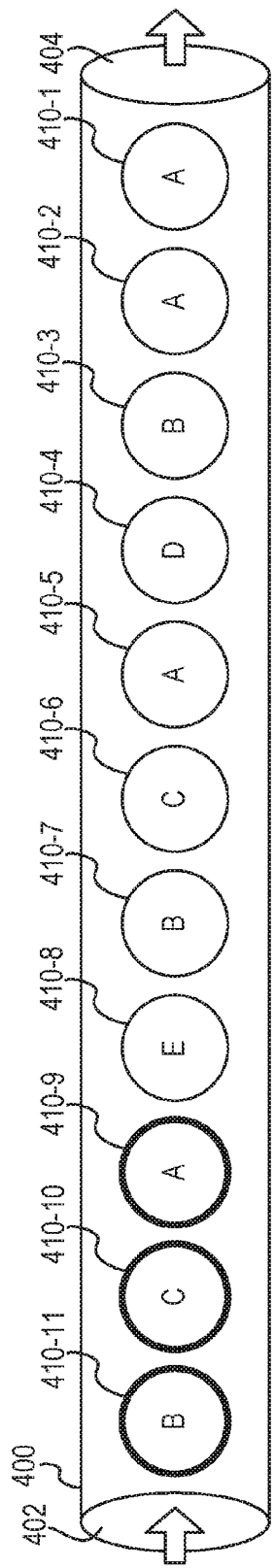

In the example embodiment shown in FIG. 4C, computing event 410-9 is identified as the youngest computing event of group A, and thus is selected as the single representative computing event 410 in group A (as shown by computing event 410-9 being bolded), computing event 410-11 is identified as the youngest computing event of group B, and thus is selected as the single representative computing event 410 in group B (as shown by computing event 410-11 being bolded), and computing event 410-10 is identified as the youngest computing event of group C, and thus is selected as the single representative computing event 410 in group C (as shown by computing event 410-10 being bolded).

In some example embodiments, the selecting of the computing event 410 in the group to be the single representative computing event 410 of the group may alternatively comprise identifying an oldest computing event 410 in the group, and then selecting the identified oldest computing event 410 of the first group to be the single representative computing event 410 of the group based on the selected computing event 410 being identified as the oldest computing event 410 in the group. For example, for an identified group, the merging module 320 can determine which computing event 410 in that identified group comprises the earliest timestamp.

Additionally, other ways of selecting a computing event 410 of a particular group of computing events 410 to be the single representative computing event 410 of that group may be employed within the scope of the present disclosure. In that respect, any one of the computing events 410 in the group of computing events 410, from the oldest to the youngest, may be selected to be the single representative computing event 410 of the group.

The method of selecting a computing event 410 of a group of computing events 410 in the pipeline 400 to be a single representative computing event 410 of the group can be stored in the database(s) 340 and accessed by the merging module 320. In some example embodiments, the method of selecting a computing event 410 of a group of computing events 410 in the pipeline 400 to be a single representative computing event 410 of the group is indicated by the merge method attribute of the computing event 410.

In some example embodiments, the merging module 320 is configured to merge the computing events 410 of the same group into a single representative computing event 410 of that group in the execution pipeline 410 by removing all of the computing events 410 of the group other than the selected single representative computing event 410 for that group from the execution pipeline 400.

Figure 4D:
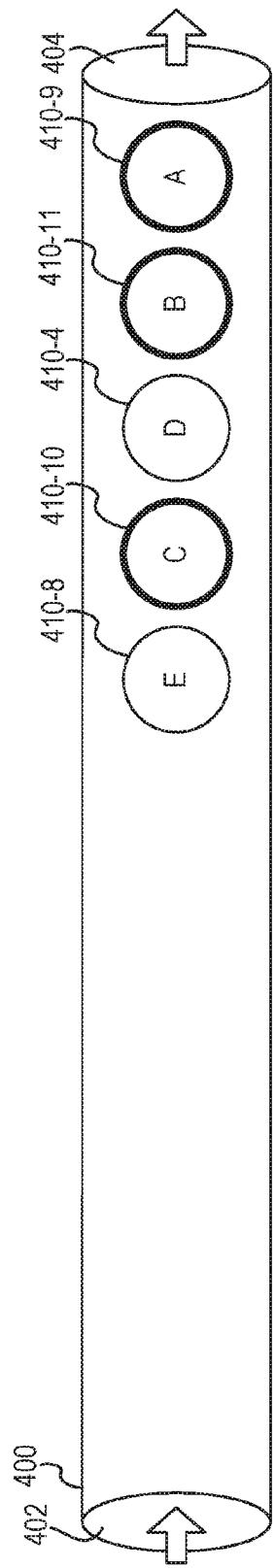

In the example embodiment shown in FIG. 4D, the merging module 320 removes all of the other computing events 410 of group A other than the selected single representative computing event 410 of group A from the execution pipeline 400 (removing computing events 410-1, 410-2, and 410-5), removes all of the other computing events 410 of group B other than the selected single representative computing event 410 of group B from the execution pipeline 400 (removing computing events 410-3 and 410-7), and removes all of the other computing events 410 of group C other than the selected single representative computing event 410 of group C from the execution pipeline 400 (removing computing event 410-6). As a result, in FIG. 4D, the execution pipeline 400 has computing event 410-9 representing group A at the head 404 of the execution pipeline 400, followed by computing event 410-11 representing group B, followed by computing event 410-4 of group D, followed by computing event 410-10 representing group C, followed by computing event 410-8 representing group E.

In some example embodiments, the merging module 320 maintains the order of the group of computing events 410 with respect to one another in the execution pipeline 400 when merging each group of computing events 410 into the single representative computing event 410 of the group. In this way, the merging module 320 prevents a submitter of a computing event 410 from being penalized (e.g., losing its priority in the queue) simply for subsequently submitting another computing event 410 of the same group. For example, referring to the example embodiments shown in FIGS. 4C and 4D, although computing event 410-9 of group A and computing event 410-11 of group B entered the execution pipeline 400 after computing event 410-4 of group D (see FIG. 4C), the merging module 320 places computing event 410-9 of group A and computing event 410-11 of group B in front of computing event 410-4 of group D in the execution pipeline 400 when performing the merging of computing events 410 (see FIG. 4D), since the youngest computing event 410 of group A (computing event 410-1) and the youngest computing event 410 of group B (computing event 410-3) were submitted before the youngest computing event of group D (computing event 410-4).

In other example embodiments, the merging module 320 does not use the original order of the earliest computing event 410 of each group when determining the position of the single representative computing events 410 of the groups during the merging of the computing events 410, but rather uses the order of the most recent computing events 410 of the groups. For example, using the example embodiments shown in FIG. 4C, the merging module 320 may merge the computing events 410 using the position of the most recent computing event 410 of each group in determining the order of the single representative computing events 410 in the execution pipeline 400, such that the execution pipeline 400 has computing event 410-4 representing group D at the head 404 of the execution pipeline 400, followed by computing event 410-8 representing group E, followed by computing event 410-9 of group A, followed by computing event 410-10 representing group C, followed by computing event 410-11 representing group B.

In applying techniques of the present disclosure, the example embodiment shown in FIGS. 4A-4D show how the number of computing events 410 in the execution pipeline 400 can be significantly reduced (e.g., being reduced from eleven computing events 410 in FIG. 4A to five computing events 410 in FIG. 4D), thereby enabling the event processing system 300 to handle a greater number of different (e.g., non-duplicate) computing events 410 without having to add any processing units to handle the computing events 410.

In some example embodiments, the merging module 320 removes less than all of the computing events 410 of the group other than the selected single representative computing event 410 for that group from the execution pipeline 400. For example, the merging module 320 may remove all of the computing events 410 of the group other than the two oldest or the two youngest computing events 410 of the group of computing events 410. It is contemplated that other methods of reducing the number of similar (e.g., duplicate) computing events 410, involving different degrees of reduction, are also within the scope of the present disclosure. Furthermore, in some example embodiments, the event processing system 300 is configured to enable a user to customize the rules and methods for when and how computing events 410 are to be merged. This customization can be enabled via a user interface provided to the user by the event processing system 300, such as by the user entering the customized rules and methods, via the user interface, into the event processing system 300, where they may be stored in the database(s) 340. In some example embodiments, the customization of merging rules and methods is implemented via the merge method attribute of a computing event 410, where the user or program responsible for the computing event 410 being entered into the execution pipeline 400 can indicate the customized merging rule and/or method via the merge method attribute.

In some example embodiments, the execution module 330 is configured to execute the computing events 410 in the execution pipeline 400, including the selected single representative computing events 410 of each group of computing events 410. For example, the execution module 330 may comprise an event handler configured to process computing events 410 from the execution pipeline 400. In some example embodiments, the execution module 410 is configured to execute, or otherwise process, the computing events 410 from head 404 of the execution pipeline 400, such as in a FIFO-type execution pipeline.

Figure 5:
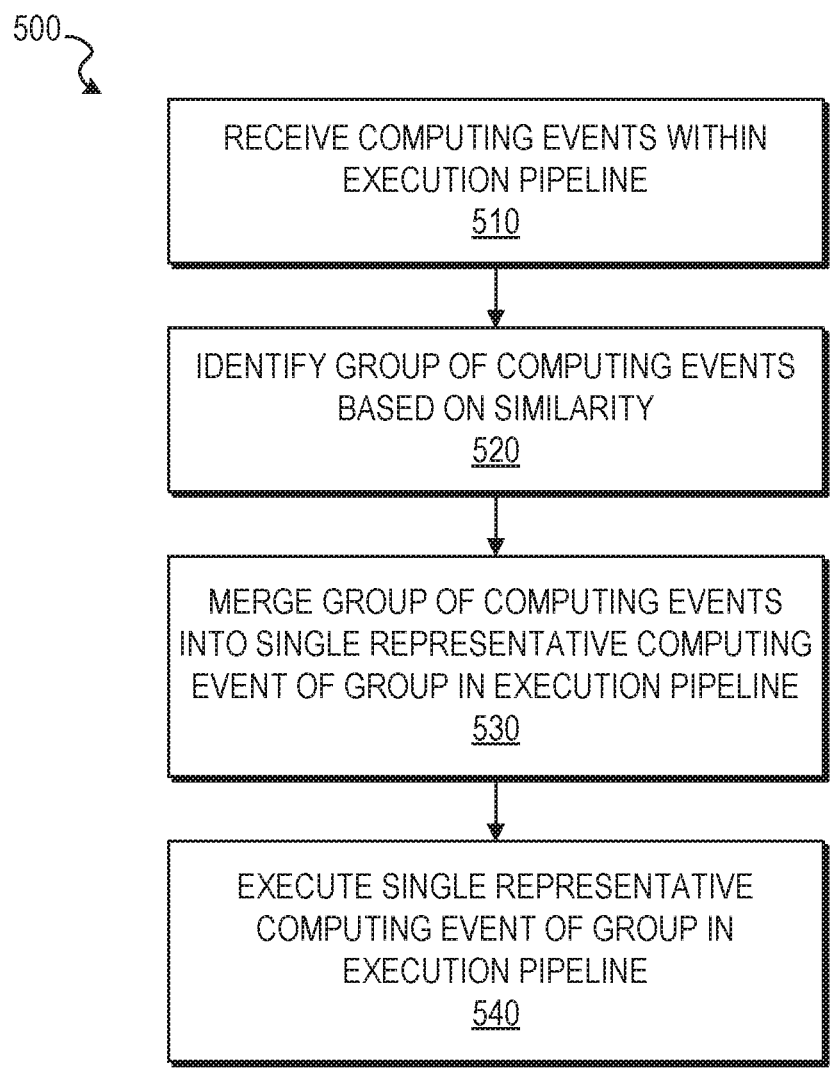
FIG. 5 is a flowchart illustrating a method of increasing efficiency of an event processing system, in accordance with some example embodiments.

FIG. 5 is a flowchart illustrating a method of increasing efficiency of an event processing system, in accordance with some example embodiments. Method 500 can be performed by processing logic that can comprise hardware (e.g., circuitry, dedicated logic, programmable logic, microcode, etc.), software (e.g., instructions run on a processing device), or a combination thereof. In one example embodiment, the method 500 is performed by the event processing system 300 of FIG. 3, or any combination of one or more of its components or modules (e.g., identification module 310, merging module 320, execution module 330), as described above.

At operation 510, a plurality of computing events 410 are received within an execution pipeline 400. In some example embodiments, the execution pipeline 400 comprises a first-in first-out (FIFO) data structure. At operation 520, the event processing system 300 identifies a group (e.g., a first group) of computing events 410 from a plurality of computing events 410 in the execution pipeline 400 based on a similarity between the computing events 410 of the first group. In some example embodiments, at operation 520, the event processing system 300 also identifies one or more additional groups (e.g., a second group, a third group, etc.) of computing events 410 from the plurality of events 410 in the execution pipeline 400 based on, for each additional group, a similarity between the computing events 410 of the additional group. At operation 530, for one or more of the groups identified at operation 520, the event processing system 300 merges the computing events 410 of the group into a single representative computing event 410 of the group in the execution pipeline 400 based on a merging criteria being satisfied. In some example embodiments, the merging criteria is simply that the computing events 410 belong to the same group, while in other example embodiments, the merging criteria includes one or more additional standards, such as a minimum number of computing events 410 in the group, although other types of merging criteria are also within the scope of the present disclosure. At operation 540, the event processing system 300 executes the single representative computing event 410 of the first group.

It is contemplated that any of the other features described within the present disclosure can be incorporated into method 500.

Figure 6:
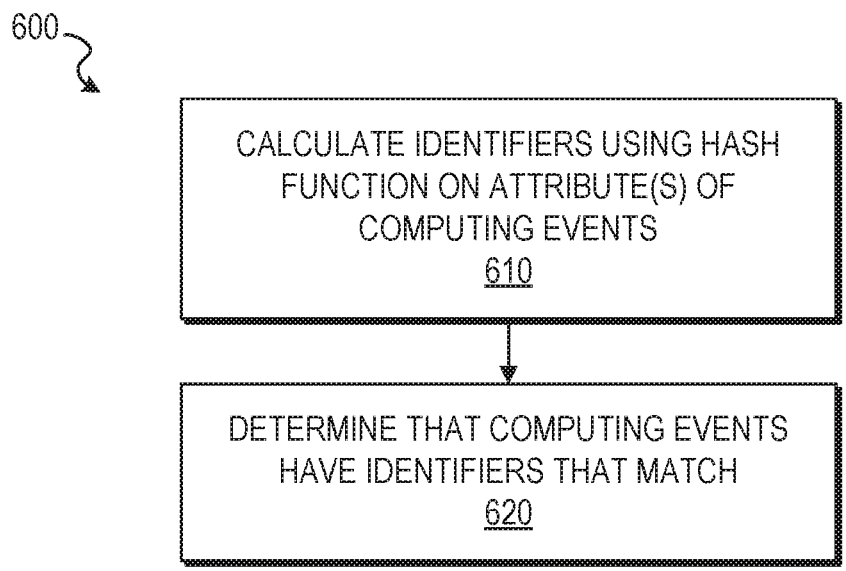
FIG. 6 is a flowchart illustrating a method of identifying a group of computing events, in accordance with some example embodiments.

FIG. 6 is a flowchart illustrating a method of identifying a group of computing events, in accordance with some example embodiments. Method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by the event processing system 300 of FIG. 3, or any combination of one or more of its components or modules (e.g., identification module 310, merging module 320, execution module 330), as described above.

At operation 610, the event processing system 300 calculates a corresponding identifier using a hash function on at least one attribute of the corresponding computing event 410 for each one of the plurality of computing events 410 in the execution pipeline 400. In some example embodiments, the at least one attribute comprises at least one of an event type, an event identification, an event content, and a merge method. In some example embodiments, the hash function comprises an MD5 hash function. At operation 620, the event processing system 300 determines that the computing events 410 of the first group have corresponding identifiers that match each other.

It is contemplated that any of the other features described within the present disclosure can be incorporated into method 600.

Figure 7:
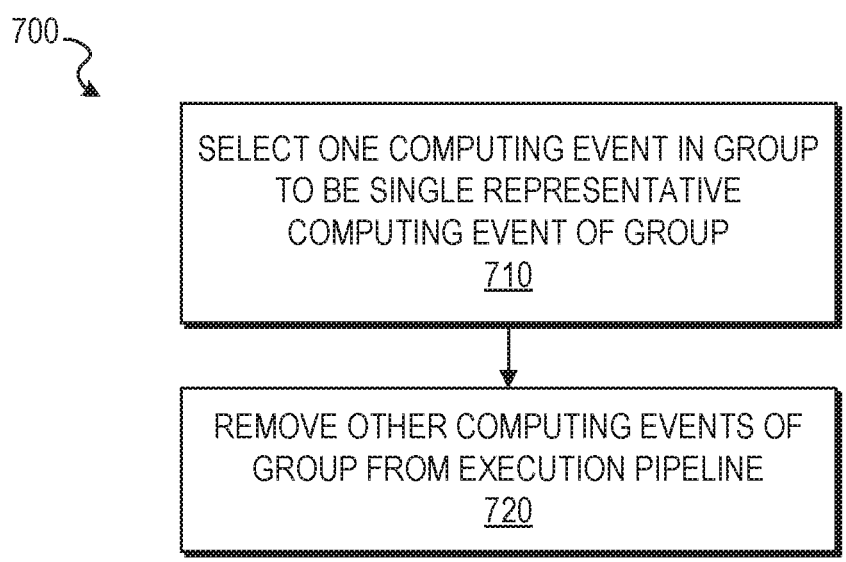
FIG. 7 is a flowchart illustrating a method of merging computing events of a group, in accordance with some example embodiments.

FIG. 7 is a flowchart illustrating a method of merging computing events of a group, in accordance with some example embodiments. Method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by the event processing system 300 of FIG. 3, or any combination of one or more of its components or modules (e.g., identification module 310, merging module 320, execution module 330), as described above.

At operation 710, the event processing system 300 selects one of the computing events 410 of the first group to be the single representative computing event 410 of the first group. In some example embodiments, the selecting of the one of the computing events 410 of the first group to be the single representative computing event 410 of the first group comprises identifying an oldest computing event 410 in the first group, and selecting the one of the computing events 410 of the first group to be the single representative computing event 410 of the first group based on the selected one being identified as the oldest computing event 410 in the first group. In some example embodiments, the selecting of the one of the computing events 410 of the first group to be the single representative computing event 410 of the first group comprises identifying a youngest computing event 410 in the first group, and selecting the one of computing events 410 of the first group to be the single representative computing event 410 of the first group based on the selected one being identified as the youngest computing event 410 in the first group. At operation 720, the event processing system 300 removes all of the computing events 410 of the first group other than the selected one from the execution pipeline 400.

It is contemplated that any of the other features described within the present disclosure can be incorporated into method 700.

Figure 8:
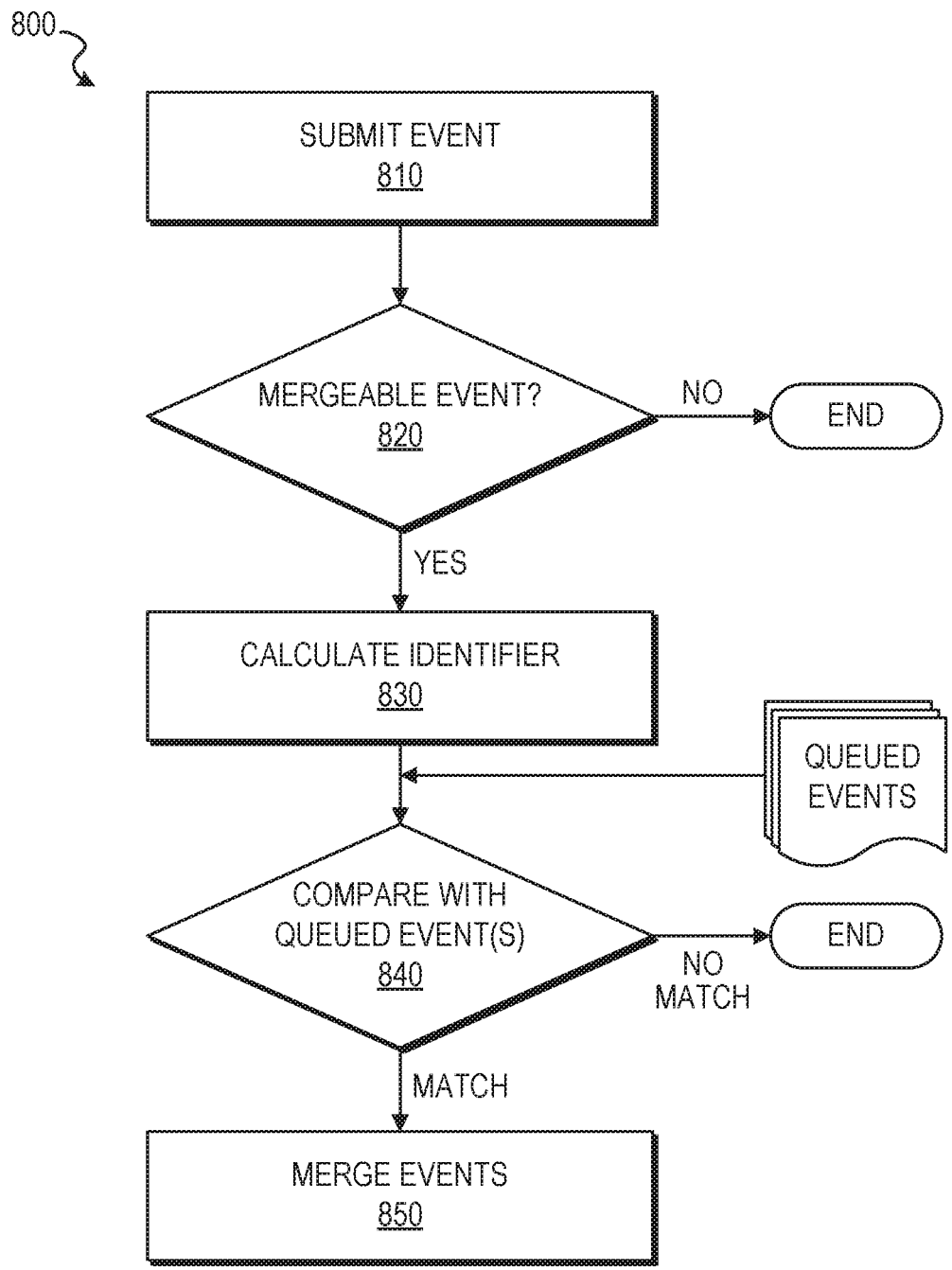
FIG. 8 is a flowchart illustrating another method of increasing efficiency of an event processing system, in accordance with some example embodiments.

FIG. 8 is a flowchart illustrating another method of increasing efficiency of an event processing system, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the event processing system 300 of FIG. 3, or any combination of one or more of its components or modules (e.g., identification module 310, merging module 320, execution module 330), as described above.

At operation 810, a computing event 410 is submitted to the execution pipeline 400. At operation 820, it is determined whether or not the computing event 410 is allowed or otherwise capable of being merged. In some example embodiments, this determination of operation 820 is made based on an event type attribute of the computing event 410 that indicates whether or not the computing event 410 is allowed or otherwise capable of being merged. If it is determined, at operation 820, that the computing event 410 is not allowed or otherwise capable of being merged, then the method 800 may be terminated, or alternatively loop back to operation 810 where another computing event 410 is submitted. If it is determined, at operation 820, that the computing event 410 is allowed or otherwise capable of being merged, then the method proceeds to operation 830, where an identifier is calculated for the computing event 410. In some example embodiments, the identifier is calculated using a hash function on one or more attributes of the computing event 410, as previously described. At operation 840, the calculated identifier of the computing event 410 is compared with the corresponding calculated identifier of one or more other computing events 410, which may have already been queued in the execution pipeline 400, in order to determine whether they match. If it is determined, at operation 840, that the computing event 410 does not match the other computing event(s) 410, then the method 800 may be terminated, or alternatively loop back to operation 810 where another computing event 410 is submitted. If it is determined, at operation 840, that the computing event 410 matches the other computing event(s) 410, then the method 800 proceeds to operation 850, where the computing event 410 is merged with the other computing event(s) 410, such as by using any of the merging techniques disclosed herein.

It is contemplated that any of the other features described within the present disclosure can be incorporated into method 800.

The following pseudo-code provides examples of how to implement aspects of the systems and methods of increasing the efficiency of an event processing system 300, in accordance with some example embodiments:

```
public Enum EventType{
    Mergerable,NoneMergerable
}
public Enum MergeMethod{
    LastOne,Append,ByRule
}
Event{
    private String eventName;
    private String content;
    private Variable[ ] variables;
    private EventType type;
    private MergeMethod mergeMethod;
    private String companyId;
    private String callback;
}
Variable{
    String name;
    String value;
}
EventPipe{
    private static Queue<EnhancedEvent> eventQueue = new LinkedBlockingQueue<EnhancedEvent>( );
    public static void submitEvent(Event evt){
        EnhancedEvent eevt = new EnhancedEvent( );
        eevt.uniqueIdentifier=calculateUniqueIdentifier(evt)
        eevt.event = evt;
```

-continued

```
        eventQueue.add(eevt);
    }
    public static Queue<Event> takeAll( ){
        return eventQueue.pullAll( );
    }
}
ExampleEvent{
    eventName:"RefreshAllGroups"
    content:""
    eventVaribles:""
    EventType type:"Mergerable"
    MergeMethod mergeMethod:"LastOne"
    companyId:"PepsiCo"
}
String calculateUniqueIdentifier(Event evt){
    //PepsiCo RefreshAllGroups LastOne Mergerable
        String identifer = event.company +
    evt.eventName+content+mergeMethod+eventtype;
        MessageDigest messageDigest =
MessageDigest.getInstance("MD5");
        byte[ ] inputByteArray = identifer.getBytes( );
        messageDigest.update(inputByteArray);
        byte[ ] resultByteArray = messageDigest.digest( );
        identifier = new String(resultByteArray);
        //identifier = "XNaJ+vDzqkuv7prG4eC0cA==";
        return identifier;
}
private EventTracker extends Runnable{
        private static ScheduledThreadPoolExecutor timerTask = new
    ScheduledThreadPoolExecutor(5);
        static{
            EventTracker tracker = new EventTracker( );
            long delay = 1;
            long trackerExecutionPeriod = 30;
            timerTask.scheduleAtFixedRate(tracker,
    delay,trackerExecutionPeriod, TimeUnit.SECONDS );
        }
        /*
        *can be invoked every minute and pull events from eventQueue,
        *then apply depress algorithm
        */
        public void run( ){
            Queue<Event> rawEvents = EventPipe.takeAll( );
            LinkedHashMap<UniqueIdentier,Event>
compressedOnes = LinkedHashMap<UniqueIdentier,Event>( );
            for(Event evt:oneMinuteTimeWindow){
                if(evt.EventType == NoneMergerable){
                    addNoneMergerableEvents(compressedOnes)
                }else{
                    switch(evt.megerMethod){
                        case
    LastOne:depressForLastOne(compressedOnes,evt);
                        case
    Append:appendEvent(compressdOnes,evt);
                        case Customized:...
                    }
                }
            }
            EventProcessor.processUniqueEvents(compressedOnes)
        }
}
void addNoneMergerableEvents(compressedOnes,evt){
        compressedOnes.add(evt);
}
void depressForLastOne(compressedOnes,evt){
        //always direct put into container, the last one will override the
    existing one
        compressedOnes.put(evt.uniqueIdentifier,evt);
}
void appendEvent(compressedOnes,evt){
        EnhancedEvent eevt= compressedOnes.get(evt.uniqueIdentifier);
        //see if there is a event in same type in the queue
        if(eevt == null){
            compressedOnes.put(evt.uniqueIdentifier,evt);
        }else{//if event piple already has this type, then append it
            eevt.addVariables(evt.variables);
        }
}
```

-continued

```
EnhancedEvent{
    String uniqueIdentifier;
    Event evt;
    List<Variable[ ]> event Variables
    void addVariables(Variable[ ] variable){
        event Variables.add(variable);
    }
    public void hashCode( ){
        uniqueIdentifier
    }
    public void equal (EnhancedEvent other){
        return uniqueIdentifier.equals(other.uniqueIdentifier);
    }
}
/***
*
*unique events to be processed
*
*/
private class EventProcessor{
    void processUniqueEvents(LinkedHashMap<Event> compressedOnes){
        //...
    }
}
```

It is contemplated that other pseudo-code may be used to implement the techniques disclosed herein. Furthermore, it is contemplated that any features of any embodiments disclosed herein can be combined with any other features of any other embodiments disclosed herein. Accordingly, these any such hybrid embodiments are within the scope of the present disclosure.

One example of a practical use case in which the features of the present disclosure can be used involves dynamic group refresh. Many applications may have dynamic user groups. For example, there may be many groups with filters, such as "division=engineering" and "location=Shanghai." If user create, read, update and delete (CRUD) operations are being performed, especially bulk user CRUD operations, computing events 410 may be sent to the event processing system 300 for dynamic group refresh to be performed in the backend. These kind of computing events 410 may be company-wide and can be merged. If there are many group refresh computing events 410, refreshing once may be enough.

Another example of a practical use case in which the features of the present disclosure can be used involves locale change notifications. For many systems, users can both login from an application and from a mobile client. For example, if a user changes his or her locale once or accidently changes his or her locale more than once, there will be locale change computing events 410 sent out to mobile devices. These kind of computing events 410 can be merged using the techniques of the present disclosure. For example, executing the last-submitted computing event 410 (e.g., the youngest or most recently-submitted computing event 410), rather than executing the multiple locale change computing events 410, may be sufficient.

Yet another example of a practical use case in which the features of the present disclosure can be used involves welcome messages. When creating new users for a system, the system may send a welcome message to each of the new users automatically. In some example embodiments, the welcome messages use the same template, such that these kind of computing events can be merged and appended to one computing event 410. All of the new user names may be appended to a string in the one computing event 410. Then, when the one computing event 410 is executed, welcome messages can be sent with different user names and emails based on the template and string of the one computing event 410.

It is contemplated that other use cases are also within the scope of the present disclosure.

Figure 9:
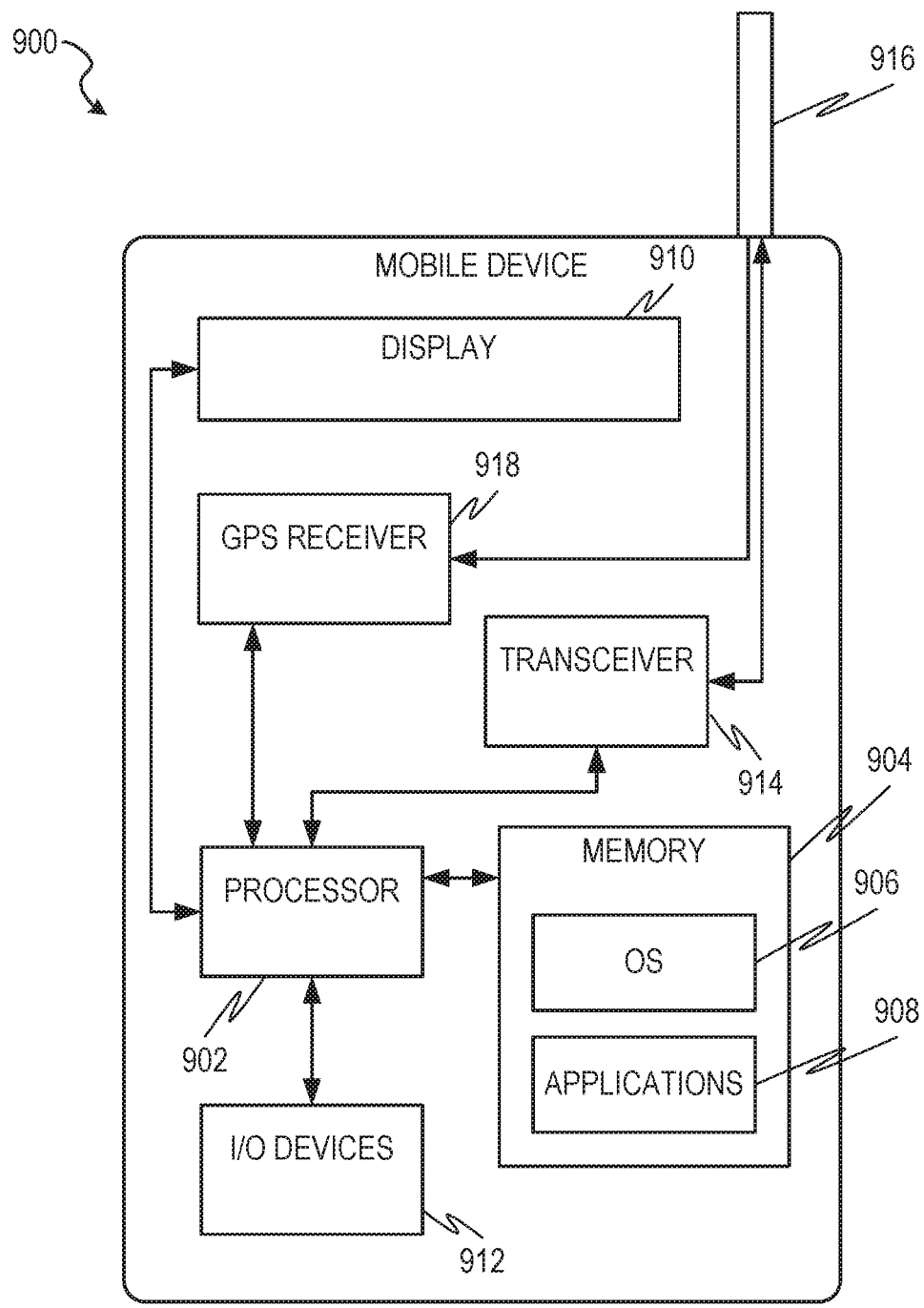
FIG. 9 is a block diagram illustrating a mobile device, in accordance with some example embodiments.

FIG. 9 is a block diagram illustrating a mobile device 900, in accordance with some example embodiments. The mobile device 900 can include a processor 902. The processor 902 can be any of a variety of different types of commercially available processors suitable for mobile devices 900 (for example, an XScale architecture microprocessor, a Microprocessor without Interlocked Pipeline Stages (MIPS) architecture processor, or another type of processor). A memory 904, such as a random access memory (RAM), a Flash memory, or other type of memory, is typically accessible to the processor 902. The memory 904 can be adapted to store an operating system (OS) 906, as well as application programs 908, such as a mobile location enabled application that can provide LBSs to a user. The processor 902 can be coupled, either directly or via appropriate intermediary hardware, to a display 910 and to one or more input/output (I/O) devices 912, such as a keypad, a touch panel sensor, a microphone, and the like. Similarly, in some example embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
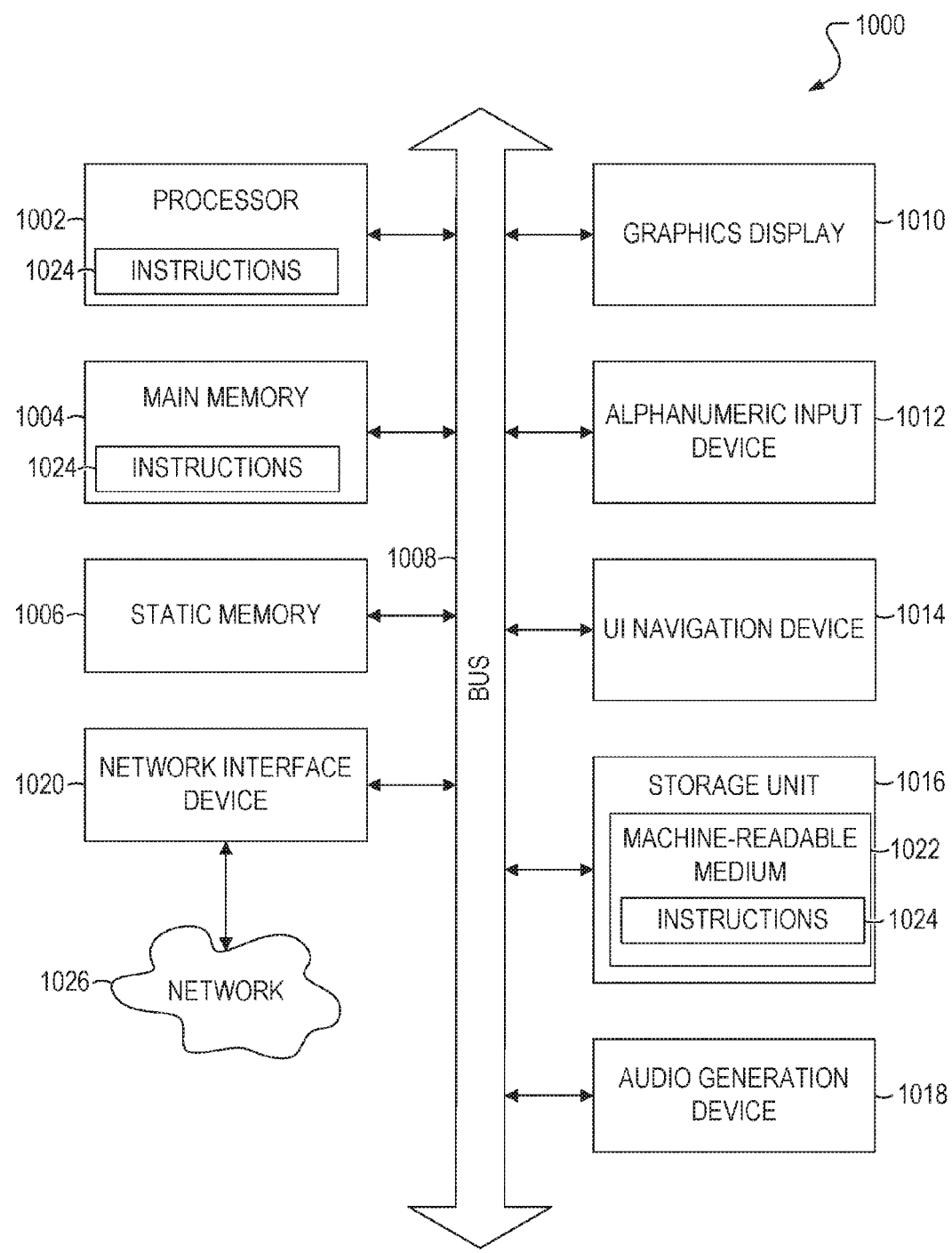
FIG. 10 is a block diagram of an example computer system on which methodologies described herein can be executed, in accordance with some example embodiments.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a graphics or video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit (e.g., a disk drive unit) 1016, an audio or signal generation device 1018 (e.g., a speaker), and a network interface device 1020.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for selective gesture interaction using spatial volumes. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system of increasing efficiency in an event processing system, the system comprising:
    at least one processor; and
    a non-transitory computer-readable medium storing executable instructions that, when executed, cause the at least one processor to perform operations comprising:
    identifying a first group of computing events from a plurality of computing events in an execution pipeline based on a similarity between the computing events of the first group, the identifying comprising determining that the computing events of the first group of computing events in the execution pipeline have corresponding identifiers that match each other;
    determining that a computing event of the first group of computing events is allowed to merge; and
    based on the determination that the computing events of the first group have corresponding identifiers that match each other and the determination that the computing event of the first group is allowed to merge, merging the computing events of the first group into a single representative computing event of the first group in the execution pipeline, the merging the computing events of the first group comprises:
        identifying one of the computing events of the first group as the oldest computing event in the first group;
        selecting the one of the computing events of the first group to be the single representative computing event of the first group based on the identifying of the one of the computing events of the first group as the oldest computing event in the first group; and
        removing all of the computing events of the first group other than the selected one from the execution pipeline.

2. The system of claim 1, wherein the execution pipeline comprises a first-in first-out (FIFO) data structure.

3. The system of claim 1, wherein the identifying the first group of computing events comprises:
    for each one of the plurality of computing events in the execution pipeline, calculating a corresponding identifier using a hash function on at least one attribute of the corresponding computing event.

4. The system of claim 3, wherein the at least one attribute comprises at least one of an event type, an event identification, an event content, and a merge method.

5. The system of claim 3, wherein the hash function comprises an MD5 hash function.

6. The system of claim 1, wherein the operations further comprise executing the single representative computing event of the first group.

7. The system of claim 1; wherein the operations further comprise:
    identifying a second group of computing events from the plurality of computing events in the execution pipeline based on a similarity between the computing events of the second group; and
    merging the computing events of the second group into a single representative computing event of the second group in the execution pipeline, the single representative computing event of the second group being in the execution pipeline concurrently with the single representative computing event of the first group.

8. A computer-implemented method of increasing efficiency in an event processing system, the computer-implemented method comprising:
    identifying, by a machine having a memory and at least one hardware processor, a first group of computing events from a plurality of computing events in an execution pipeline based on a similarity between the computing events of the first group, the identifying comprising determining that the computing events of the first group of computing events in the execution pipeline have corresponding identifiers that match each other;
    determining that a computing event of the first group of computing events is allowed to merge; and
    based on the determination that the computing events of the first group have corresponding identifiers that match each other and the determination that the computing event of the first group is allowed to merge, merging the computing events of the first group into a single representative computing event of the first group in the execution pipeline, the merging the computing events of the first group comprises:
  identifying one of the computing events of the first group as the oldest computing event in the first group;
  selecting the one of the computing events of the first group to be the single representative computing event of the first group based on the identifying of the one of the computing events of the first group as the oldest computing event in the first group; and
  removing all of the computing events of the first group other than the selected one from the execution pipeline.

9. The computer-implemented method of claim 8, wherein the execution pipeline comprises a first-in first-out (FIFO) data structure.

10. The computer-implemented method of claim 8, wherein the identifying the first group of computing events comprises:
  for each one of the plurality of computing events in the execution pipeline, calculating a corresponding identifier using a hash function on at least one attribute of the corresponding computing event.

11. The computer-implemented method of claim 10, wherein the at least one attribute comprises at least one of an event type, an event identification, an event content, and a merge method.

12. The computer-implemented method of claim 10, wherein the hash function comprises an MD5 hash function.

13. The computer-implemented method of claim 8, further comprising executing the single representative computing event of the first group.

14. The computer-implemented method of claim 8, further comprising:
  identifying a second group of computing events from the plurality of computing events in the execution pipeline based on a similarity between the computing events of the second group; and
  merging the computing events of the second group into a single representative computing event of the second group in the execution pipeline, the single representative computing event of the second group being in the execution pipeline concurrently with the single representative computing event of the first group.

15. A non-transitory machine-readable storage medium, tangibly embodying a set of instructions that, when executed by at least one processor, causes the at least one processor to perform operations for increasing efficiency in an event processing system, the operations comprising:
  identifying a first group of computing events from a plurality of computing events in an execution pipeline based on a similarity between the computing events of the first group, the identifying comprising determining that the computing events of the first group of computing events in the execution pipeline have corresponding identifiers that match each other;
  determining that a computing event of the first group of computing events is allowed to merge; and
  based on the determination that the computing events of the first group have corresponding identifiers that match each other and the determination that the computing event of the first group is allowed to merge, merging the computing events of the first group into a single representative computing event of the first group in the execution pipeline, the merging the computing events of the first group comprises:
    identifying one of the computing events of the first group as the oldest computing event in the first group;
    selecting the one of the computing events of the first group to be the single representative computing event of the first group based on the identifying of the one of the computing events of the first group as the oldest computing event in the first group; and
    removing all of the computing events of the first group other than the selected one from the execution pipeline.

16. The storage medium of claim 15, wherein the identifying the first group of two or more computing events comprises:
  for each one of the plurality of computing events in the execution pipeline, calculating a corresponding identifier using a hash function on at least one attribute of the corresponding computing event.

* * * * *